US 7,272,160 B1

(12) United States Patent
Geng et al.

(10) Patent No.: US 7,272,160 B1
(45) Date of Patent: Sep. 18, 2007

(54) SINGLE-FREQUENCY BRILLOUIN FIBER RING LASER WITH EXTREMELY NARROW LINEWIDTH

(75) Inventors: Jihong Geng, Tucson, AZ (US); Shibin Jiang, Tucson, AZ (US)

(73) Assignee: NP Photonics, Inc, Tucson, AZ (US)

( * ) Notice: Subject to any disclaimer, the term of this patent is extended or adjusted under 35 U.S.C. 154(b) by 142 days.

(21) Appl. No.: 11/096,472

(22) Filed: Mar. 31, 2005

Related U.S. Application Data (60) Provisional application No. 60/646,350, filed on Jan. 24, 2005.

(51) Int. Cl.
*H01S 3/083* (2006.01)
*H01S 3/13* (2006.01)
*H01S 3/30* (2006.01)

(52) U.S. Cl. .................... 372/94; 372/29.011
(58) Field of Classification Search .............. 372/71
See application file for complete search history.

(56) References Cited

U.S. PATENT DOCUMENTS

| | | | |
|---|---|---|---|
| 4,107,628 A | | 8/1978 | Hill et al. |
| 4,422,154 A | * | 12/1983 | Smithline et al. ........... 702/103 |
| 4,530,097 A | | 7/1985 | Stokes et al. |
| 4,780,876 A | | 10/1988 | Smith et al. |
| 5,064,288 A | * | 11/1991 | Dyes et al. ................. 356/461 |
| 5,233,462 A | * | 8/1993 | Wong ........................... 359/330 |
| 5,323,415 A | | 6/1994 | Quast et al. |
| 5,398,111 A | * | 3/1995 | Cardarelli ................... 356/461 |
| 5,517,305 A | * | 5/1996 | Raab ........................... 356/461 |
| 5,912,910 A | * | 6/1999 | Sanders et al. ............... 372/22 |
| H1813 H | * | 11/1999 | Kersey ......................... 372/94 |
| 5,991,061 A | * | 11/1999 | Adams et al. ............... 398/182 |
| 6,567,436 B1 | * | 5/2003 | Yao et al. ..................... 372/32 |
| 6,763,042 B2 | * | 7/2004 | Williams et al. ............... 372/6 |
| 2002/0037025 A1 | * | 3/2002 | Bartman et al. ............. 372/50 |
| 2002/0105998 A1 | * | 8/2002 | Ksendzov ..................... 372/92 |

(Continued)

OTHER PUBLICATIONS

Wavelength-Tunable Single-Frequency And Single-Polarisation Erbium-Doped Fibre Ring-Laser With 1.4 kHz Linewidth, by K. Iwatsuki et al., Electronics Letters, vol. 26, No. 24, Nov. 22, 1990, pp. 2033-2035.*

(Continued)

*Primary Examiner*—Minsun Oh Harvey
*Assistant Examiner*—Sean Hagan
(74) *Attorney, Agent, or Firm*—Eric A. Gifford (57) ABSTRACT

A single-frequency Brillouin fiber ring laser with extremely narrow linewidth comprises a single-frequency narrow-linewidth rapid-tunable pump laser, a temperature-controlled acoustically-damped package for Brillouin fiber ring laser cavity, and an auto-tracking feedback electronic loop with novel configuration for active stabilization. The Pound-Drever-Hall frequency-locking technique is employed to keep pump laser frequency in resonance with one of the Brillouin fiber ring cavity modes. Instead of changing cavity length of Brillouin fiber ring laser, the pump laser frequency is rapidly tuned in the auto-tracking feedback electronic loop. This enables extremely narrow linewidth radiation emitted from a Brillouin fiber ring laser without stretching the fiber ring. Dual-wavelength actively stabilized Brillouin fiber ring laser may be generated from a single ring cavity by polarization-combining or wavelength-combining two pump laser beams and using two independent feedback loops to the two operation wavelengths.

15 Claims, 11 Drawing Sheets

U.S. PATENT DOCUMENTS

2004/0161250 A1* 8/2004 Kozlowski et al. .......... 398/204

OTHER PUBLICATIONS

Wyatt, R., Devlin, W. J., "10 kHz Linewidth 1.5um InGaAsP External Cavity Laser with 55nm Tuning Range" Electronics Letters, vol. 19, No. 3, Feb. 3, 1983, pp. 110-112.*

"Singlemode Diode-Pumped Tunable Erbium-Doped Fibre Laser With Linewidth Less Than 5.5 kHz", by J. Zyskind et al., Electronics Letters, vol. 27, No. 23, Nov. 7, 1991, pp. 2148-2149.*

"Compact hybrid resonant optical reflector lasers with very narrow linewidths.", by D. A. Ackerman et al. Applied Physics Letters vol. 58, No. 5, Feb. 4, 1991, pp. 449-451.*

"Short Single Frequency Erbium-Doped Fibre Laser", by J. Zyskind et al., Electronics Letters, vol. 28, No. 15, Jul. 16, 1992, pp. 1385-1387.*

"10 kHz-Linewidth Diode-Pumped Er:Yb:Glass Laser", by P. Laporta et al., Electronics Letters, vol. 28, No. 22, Oct. 22, 1992, pp. 2067-2069.*

"Studies of coherence properties of a diode-pumped Nd:YAG ring laser", by S. P. Bush et al., Applied Physics Letters, vol. 53, No. 8, Aug. 22, 1988, pp. 646-647.*

K.O. Hill et al., cw Brillouin laser, Applied Physics Letters, May 15, 1976, vol. 28, No. 10, pp. 608-609.

S.P. Smith et al., Narrow-linewidth stimulated Brillouin fiber laser and applications, Optics Letters, Mar. 15, 1991, vol. 16, No. 6, pp. 393-395.

J. Boschung et al., High-accuracy measurement of the linewidth of a Brillouin fibre ring laser, Electronics Letters, Sep. 1, 1994, vol. 30, No. 18 pp. 1488-1489.

Donald R. Ponikvar et al., Stabilized single-frequency stimulated Brillouin fiber ring laser, Optics Letters, Aug. 1981, vol. 6, No. 8, pp. 398-400.

P. Bayvel et al., Linewidth narrowing in semiconductor laser pumped all-fibre Brillouin ring laser, Electronics Letters, Feb. 16, 1989, vol. 25, No. 4, pp. 260-262.

Jae Chul Yong et al., Brillouin Fiber Laser Pumped by a DFB Laser Diode, Journal of Lightwave Technology, Feb. 2003, vol. 21, No. 2, pp. 546-554.

S. Norcia et al., Efficient single-mode Brillouin fiber laser for low-noise optical carrier reduction of microwave signals, Optical Society of America, Oct. 15, 2003, vol. 28, No. 20, pp. 1888-1890.

Eric D. Black, An ilntroduction to Pound-Drever-Hall laser frequency stabilization, American Association of Physics Teachers., Jan. 2001, 69 (1), pp. 79-87.

* cited by examiner

SINGLE-FREQUENCY BRILLOUIN FIBER RING LASER WITH EXTREMELY NARROW LINEWIDTH

CROSS-REFERENCE TO RELATED APPLICATIONS

This application claims benefit of priority under 35 U.S.C. 119(e) to U.S. Provisional Application No. 60/646,350 entitled "High-Power Actively-Stabilized Single-Frequency Brillouin Fiber Ring Laser with Extremely Narrow Linewidth" filed on Jan. 24, 2005, the entire contents of which are incorporated by reference.

BACKGROUND OF THE INVENTION

1. Field of the Invention

This invention relates to a highly coherent laser source with extremely narrow spectral linewidth, and more specifically to an actively-stabilized single-frequency Brillouin fiber ring laser (with spectral linewidth measured in the Hertz range) that is pumped with a high-power single-frequency fast-tuned laser.

2. Description of the Related Art

Many applications such as coherent optical communications, coherent ladar detection, and microwave photonics require highly coherent laser sources with narrow spectral linewidth. Design and performance of such optical systems strongly depend on coherence properties of the laser sources used. Diode-pumped single-frequency solid-state lasers (including fiber lasers) are the most well-known highly coherent laser sources that have a spectral linewidth ranging from hundreds of kHz to a few kHz.

A single-frequency Brillouin fiber ring laser is another type of highly coherent light source, which is based on stimulated Brillouin scattering nonlinear optical process in optical fiber. The nonlinear interactions between laser optical fields and an acoustic wave result in Brillouin scattering process in an optical medium (fiber). The laser field (pump field) generates an acoustic wave through the process of electrostriction. The acoustic wave in turn modulates the refraction index of the medium. This pump-induced index grating scatters the pump light through Bragg diffraction. Because of the Doppler shift associated with a grating moving at the acoustic velocity, the back-scattered light, which is also called as Stokes radiation, is downshifted in frequency by $v_B=2$ $nV_a/\lambda$, where $V_a$ is the acoustic velocity in the fiber. When the pump light propagates in the medium, Brillouin gain at the shifted frequency can be established in the medium.

The Brillouin gain in optical fibers can be used to make lasers by placing the fiber inside a cavity. Both the ring-cavity and the Fabry-Perot cavity have been used for making Brillouin lasers, each having its own advantages. Brillouin fiber lasers consisting of a Fabry-Perot cavity exhibit features that are quite different from those using a ring-cavity configuration. The difference arises from the simultaneous presence of the forward and backward propagating components associated with the pump and Stokes waves in a Fabry-Perot cavity. Higher-order Stokes and anti-Stokes waves are generated through cascaded stimulated Brillouin scattering (SBS) and four-wave-mixing process. This is a way to generate multi spectral lines (frequency comb).

Most Brillouin fiber lasers use a ring cavity to avoid generation of multiple Stokes lines through the cascade SBS. The first demonstration of a cw Brillouin fiber laser using an argon-ion laser and ring-cavity configuration was reported in 1976. [Appl. Phys. Lett. 28 (1976) 608]. The performance of a Brillouin fiber ring laser depends on the fiber length used to make the cavity. For short fibers (~10-40 m), the ring laser can operate stably in a single longitudinal mode (i.e., single-frequency) with extremely narrow linewidth. In contrast, a Brillouin ring laser with long fiber (>hundreds meters) operates in multiple longitudinal modes, and the number of modes increases with fiber length. The output of such long lasers can become periodic, even chaotic under some conditions. They can also exhibit mode-locking behavior under other conditions.

Due to their extremely narrow linewidth, single-frequency Brillouin fiber ring lasers pumped with a single-frequency pump laser have attracted significant interest for decades. Experiments have demonstrated that free-running spectral linewidth of the Stokes radiation generated from single-frequency Brillouin fiber ring lasers, which could potentially be only a few Hz that corresponds to a coherence length of the laser equal to tens thousands kilometers, can be several orders of magnitude narrower than that of the single-frequency pump beam used to generate stimulated Brillouin scattering in the cavity of Brillouin fiber ring laser. [S. P. Smith, F. Zarinetchi, and S. Ezekiel, "Narrow-linewidth stimulated Brillouin fiber laser and applications," Opt. Lett. 16 (1991) 393.] and [J Boschung, L. Thevenaz, and P. A. Robert, "High-Accuracy Measurement of the linewidth of a Brillouin Fiber Ring Laser," Electron. Lett. 30 (1994), p. 1488.]. In practice, however, stable single-frequency operation of Brillouin fiber ring lasers with extremely narrow linewidth is hard to realize and also is not practically useful if without active stabilization.

Brillouin fiber ring lasers (U.S. Pat. Nos. 4,107,628, 4,530,097 4,780,876, and 5,323,415) are typically lossy, unstable devices, in which no any active stabilization was used. In addition, these devices included a lot of free-space optics either for the Brillouin fiber ring cavity or for their bulk pump laser sources, which make the devices suffer from very poor stability and reliability.

In some other publications ([1]. Optics Letters, 6 (1981) 398. [2]. Electronics Letters, 25 (1989) 260. [3]. Journal of Lightwave Technology, 21 (2003) 546. [4]. Optics Letters, 28 (2003) 1888.), an active stabilization technique was mentioned. In all these prior publications, however, the active stabilization was achieved by piezo-electrically stretching part of the fiber in the Brillouin fiber ring cavity so that one cavity mode of the Brillouin ring laser is kept in resonance with its pump laser light. With this configuration of active stabilization, an auto-tracking feedback loop is applied to the Brillouin ring cavity via a PZT actuator to control the ring cavity length. Thus, the laser frequency of the Brillouin fiber ring laser output followed any frequency fluctuation of its pump laser, which usually has a much wider spectral linewidth and worse frequency fluctuation than those of the Brillouin fiber laser itself. As a result of the modulation and feedback loop, the stabilized Brillouin fiber ring lasers suffer from fast frequency modulation. As a result, the linewidth of the Brillouin fiber laser is no longer extremely narrow, it even could be wider than the narrow linewidth of its pump laser (see reference Optics Letters, 28 (2003) 1888.)

SUMMARY OF THE INVENTION

In view of the above problems, the present invention describes a Brillouin fiber ring laser with extremely narrow spectral linewidth.

The Brillouin fiber ring laser uses a single-frequency narrow-linewidth rapidly-tunable pump laser to pump a Brillouin fiber ring cavity. Active-stabilization is provided with an auto-tracking feedback loop based on the Pound-Drever-Hall frequency-locking technique, which actively tunes the pump laser to keep its frequency in resonance with one of the Brillouin fiber cavity modes. By tuning the pump laser to maintain resonance instead of stretching the ring cavity, the cavity modes are not disturbed and the extremely narrow linewidth of the ring laser is preserved.

To implement the auto-tracking feedback loop, a function generator applies a dithering signal to either the pump laser frequency (or phase) or the ring cavity thereby intensity modulating a portion of the pump that is transmitted through the ring cavity. The intensity modulated pump is demodulated to produce an error signal that is preferably amplified and applied to the pump laser to tune its frequency and maintain resonance with the ring cavity mode. Demodulation is suitably performed by mixing the intensity modulated pump with a reference signal having the same frequency as the dithering signal and low pass filtering the mixed signal.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a single-frequency Brillouin fiber ring laser with extremely narrow spectral linewidth. A single-frequency narrow-linewidth rapidly-tunable pump laser is used to pump a Brillouin fiber ring cavity. Active stabilization is provided with an auto-tracking feedback loop based on the Pound-Drever-Hall frequency-locking technique, which actively tunes the pump laser to keep its frequency in resonance with one of the Brillouin fiber cavity modes. By tuning the pump laser to maintain resonance instead of stretching the ring cavity, the cavity modes are not disturbed and the extremely narrow linewidth of the ring cavity is preserved.

Figure 1:
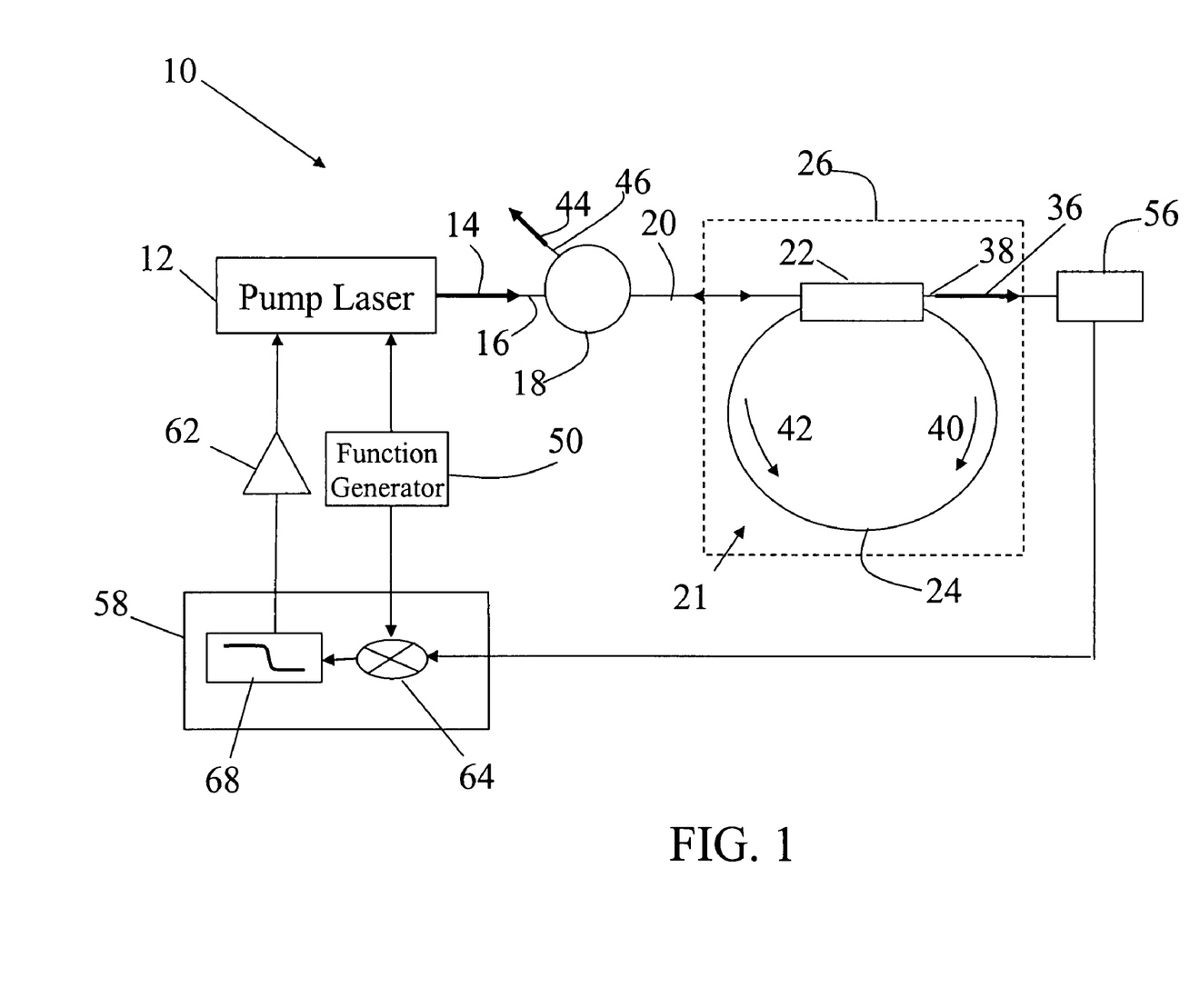
FIG. 1 illustrates a first embodiment of a Brillouin fiber ring laser with extremely narrow spectral linewidth in accordance with the present invention.

The first embodiment of a high-power actively stabilized Brillouin fiber ring laser 10 with extremely narrow spectral linewidth in accordance with the present invention is illustrated in FIG. 1. A single-frequency narrow-linewidth rapidly-tunable pump laser 12 outputs a linearly-polarized beam 14 along the slow axis (or fast axis) of its polarization-maintaining (PM) fiber pigtail 16. The pump laser beam goes through a polarization-maintaining (PM) fiber circulator 18 and exits from a PM fiber pigtail 20. As used herein to refer to both the pump and Brillouin laser beams "single-frequency" means that the beam has both a single-transverse and single-longitudinal mode structure.

Figure 2:
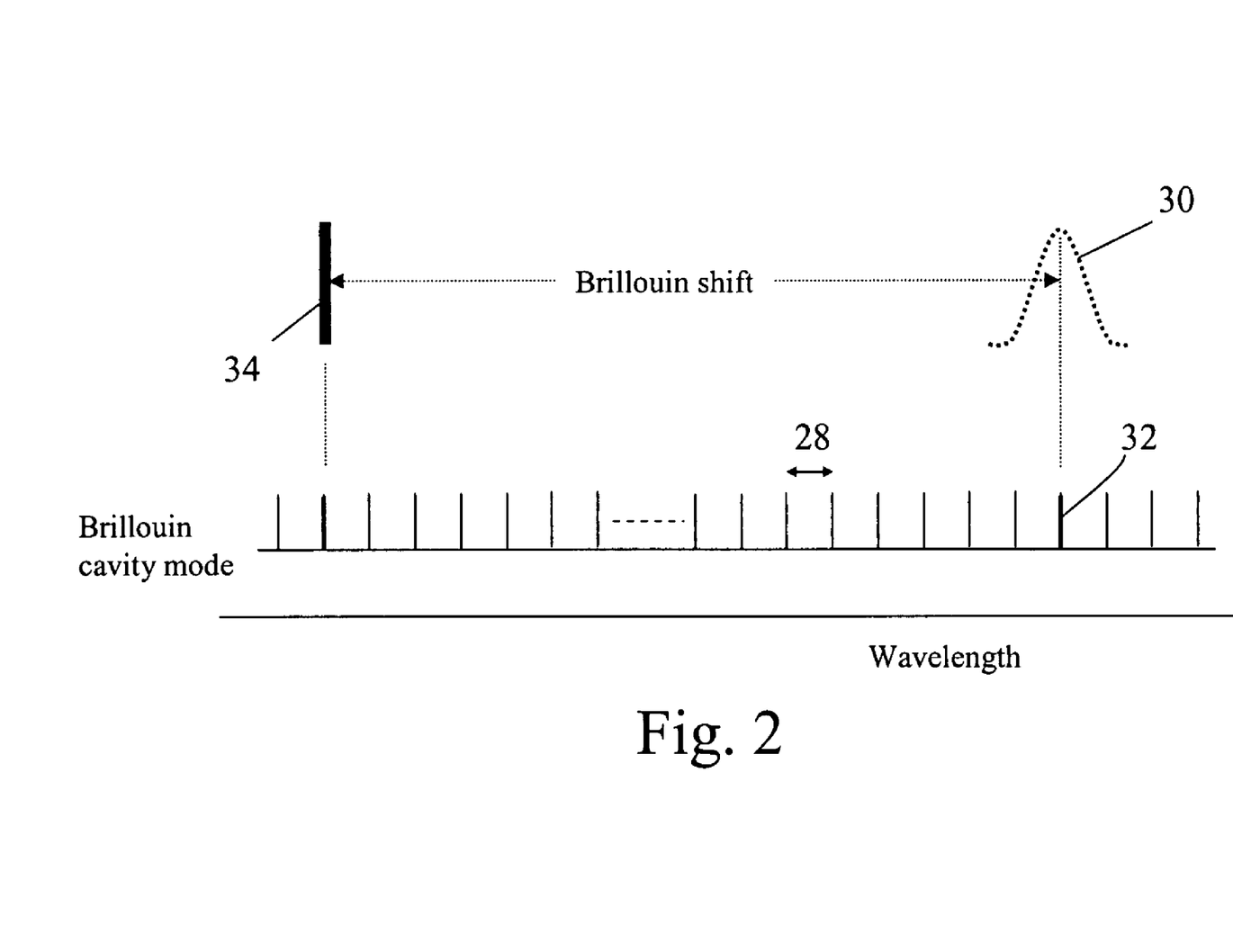
FIG. 2 illustrates the cavity mode structure and the resonance condition between the pump and cavity mode.
Figures 3A, 3B:
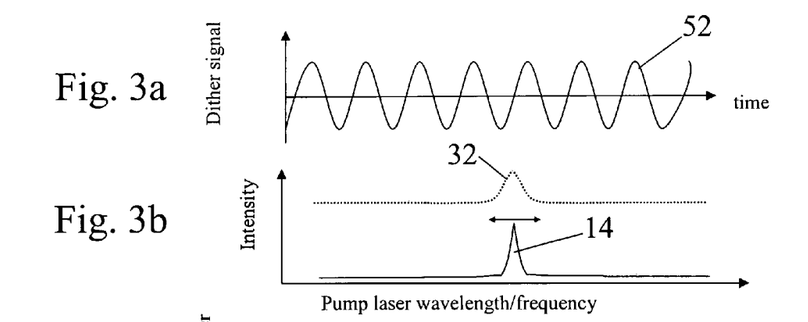
FIGS. 3a-3e illustrate the sequence of steps for actively stabilizing the Brillouin fiber ring laser.
Figure 3C:
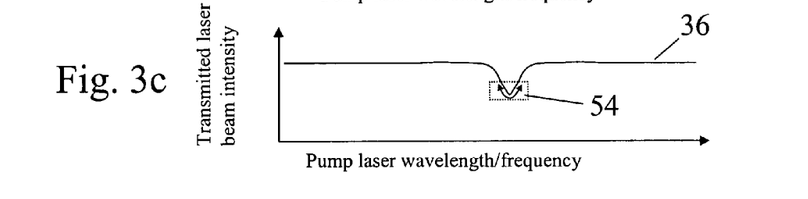
Figure 3D:
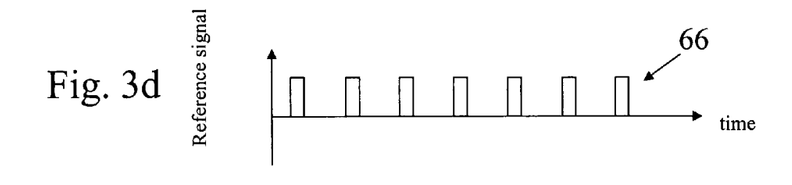
Figure 3E:
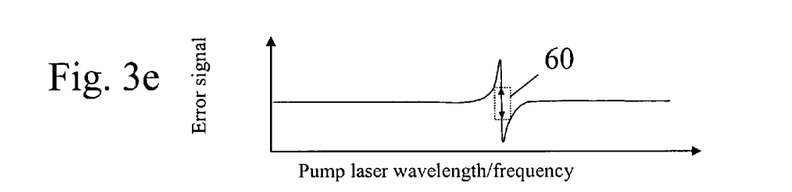

A Brillouin fiber ring cavity 21 is suitably formed by a PM directional fiber coupler 22 and a long piece of PM optical fiber 24 and packaged in a temperature-controlled acoustically-damped box 26. As shown in FIG. 2, the cavity length of the ring laser is properly set (to be about 10–40 meters) so that the free-spectral range 28 of the ring cavity is comparable to the bandwidth of the Brillouin gain profile 30 in fiber 24 at the pump laser wavelength. Consequently, at most a few cavity modes, and preferably only one cavity mode 32, are supported within the Brillouin gain profile 30. If the cavity is too long a large number of cavity modes will exist and the laser will be incapable of stable single-frequency performance regardless of the active stabilization scheme. The Brillouin fiber laser wavelength at resonant cavity mode 32 is downshifted with respect to the pump laser wavelength 34.

One part 36 of the pump beam is transmitted through one port 38 of the fiber coupler. This part is the coherent superposition of the multiple pump fields that circulate inside the ring cavity. Another part 40 of the pump beam propagates and circulates along the ring cavity fiber 24 and generates stimulated Brillouin scattering (SBS) light in the fiber. When the SBS is strong enough, the backward Stokes radiation 42 can be generated in the Brillouin laser cavity. The high-power single-frequency backward Brillouin laser beam 44 can be efficiently extracted from the third port 46 of the PM fiber circulator 18. This condition occurs when the pump frequency is in resonance with the cavity mode.

Active stabilization is provided with an auto-tracking feedback loop that is based on the Pound-Drever-Hall frequency-locking technique, which actively tunes the pump laser to keep its frequency in resonance with one of the Brillouin fiber cavity modes. Details of the technique are provided in American Journal of Physics Vol. 69, 79-87 (2001), which are hereby incorporated within. Although the Pound-Drever-Hall technique is a well known technique for improving a laser's frequency stability, our use of the technique to tune a narrow linewidth single-frequency pump laser to maintain resonance in a Brillouin fiber ring laser is novel and provides superior linewidth performance over current techniques.

The principle behind the general Pound-Drever-Hall technique is fairly simple: a laser's frequency is measured with a Fabry-Perot cavity and this measurement is fed back to the laser to suppress frequency fluctuations. This method is a kind of peak locking technique, which allows frequency locking at the maximum or minimum point of a transmission/reflection peak in frequency or wavelength by using standard frequency dithering and synchronous phase-detection techniques. In our case, we use a ring cavity to measure the pump laser frequency and lock it to the desired cavity mode.

As shown in FIGS. 3a-3e, a function generator 50 generates a dither signal 52 that is applied to the pump laser to dither (↔) the frequency of pump beam 14. For example, the dither signal at 1 kHz may vary the pump laser frequency by +/−100 kHz. The ring cavity converts the frequency modulation of the pump into an intensity modulation 54 of the transmitted pump beam 36, which is extracted through port 38 of the Brillouin fiber ring cavity and detected with a photodetector 56. Electronics 58 demodulate the intensity modulated pump to produce an error signal 60 (the derivative of the intensity modulated transmitted pump) that is preferably amplified by an amplifier 62 and fed back to the pump laser 12 to rapidly tune the laser so as to keep the frequency of pump beam 14 in resonance with one of the Brillouin laser cavity modes 32. The demodulation electronics suitably include a mixer 64 that mixes the intensity modulated pump 36 with a reference signal 66 having the same frequency as the dithering signal 52 and a low pass filter 68 that extracts the low frequency component as the error signal 60. The reference signal can be essentially any waveform such as the Transistor-Transistor-Logic (TTL) signal depicted in FIG. 3d that has the same frequency as the dithering signal and a known phase. The most typical would be a sine wave that is identical to the dither signal except for the amplitude.

Figure 4:
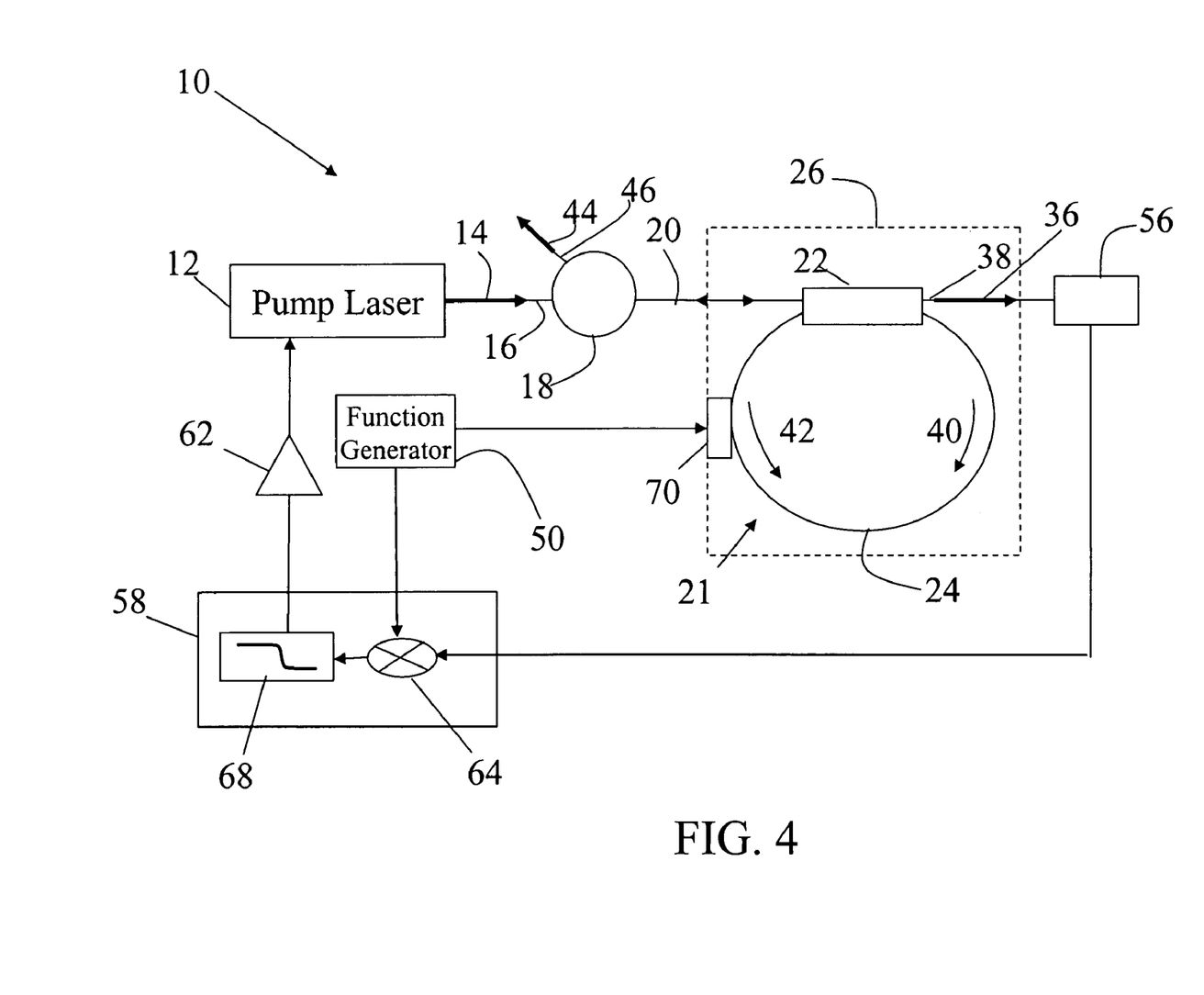
FIG. 4 illustrates a second embodiment of a high-power actively stabilized Brillouin fiber ring laser with extremely narrow spectral linewidth.

FIG. 4 illustrates a second embodiment of a Brillouin fiber ring laser 10 with extremely narrow spectral linewidth. The optics of this embodiment is the same as the first embodiment. The configuration for active stabilization is different from the first embodiment. In FIG. 4, active stabilization is achieved by a very tiny dithering of the Brillouin fiber laser cavity. Function generator 50 applies a small dither signal to a PZT actuator 70 that is bonded to fiber 24 that makes up the Brillouin fiber cavity 21. With reference to FIGS. 3a-3e, the only difference is that the frequency of cavity mode 32 is dithered (↔) instead of the pump frequency. In both cases, the frequency dithering produces an equivalent intensity modulation of the transmitted pump 36.

It is important to note that the tiny cavity modulation used in this embodiment is much different from the cavity piezoelectric stretching used to provide active stabilization in known Brillouin fiber ring lasers. In the known lasers, the error signal generated by the stabilization scheme was applied to a PZT actuator to stretch the cavity to compensate large frequency fluctuations of the pump lasers so as to keep the pump laser frequency in resonance with one of the Brillouin laser cavity modes. In other words, the cavity modes were tuned to maintain resonance with the fixed pump frequency. In these devices, the cavity stretching is typically 1~100 times of free-spectral range (5~20 MHz), which broadens the linewidth of the Brillouin laser beam; perhaps even wider than the linewidth of the pump laser. In the embodiment shown in FIG. 4, the cavity dithering is less than one one-hundredth of the free-spectral range (5~20 MHz), and preferably smaller than one ten thousandth of the FSR, and thus has no appreciable effect on linewidth.

Figure 5:
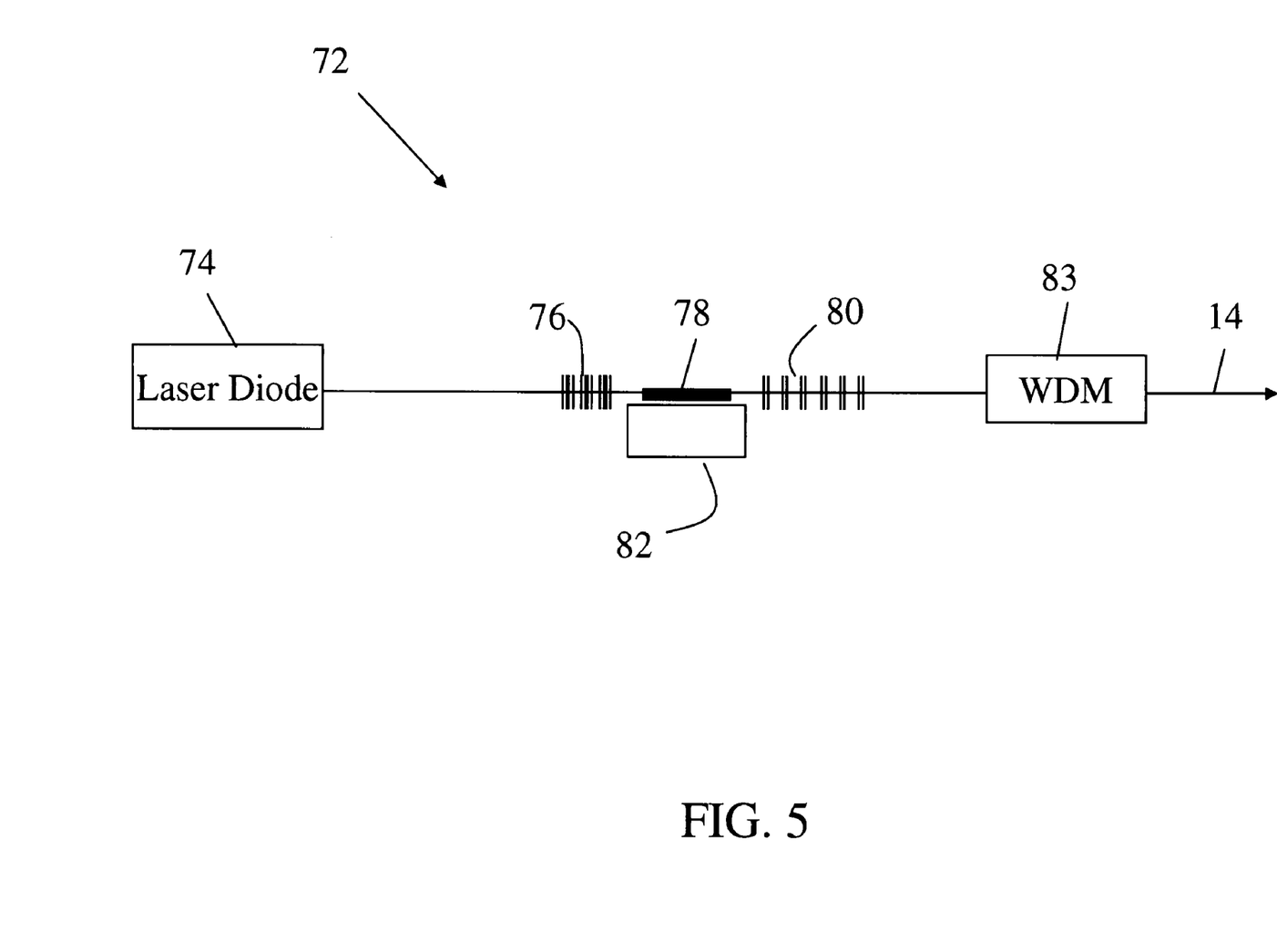
FIG. 5 illustrates an example of a compact high-power single-frequency narrow-linewidth rapid-tunable pump laser.

FIG. 5 illustrates an example of a compact high-power single-frequency narrow-linewidth rapid-tunable pump laser 72. This is a diode-pumped single-frequency narrow-linewidth fiber laser (see other patents of NP Photonics such as U.S. Pat. No. 6,816,514, which is hereby incorporated by reference). One or more laser diodes 74 are used to pump fiber laser. The fiber laser comprises a high-reflectivity fiber Bragg grating 76, and a short piece of heavily-doped phosphate glass active fiber 78, and a low-reflectivity fiber Bragg grating 80 (used as output coupler). The active fiber 78 is bonded on a small piece of PZT actuator 82 so that the laser frequency of the single-frequency fiber laser can be rapidly tuned. After a hybrid isolator/WDM (wavelength-division multiplexer) 83, the high-power single-frequency narrow-linewidth rapid-tunable fiber laser beam 14 can be used to pump the Brillouin fiber ring cavity.

The dither signal can be applied to either the PZT actuator 82 to change the cavity length and thus dither the frequency or to the drive current of the laser diodes 74 to modulate the output power and thus dither the frequency. The error signal is typically applied to the PZT actuator 82 to stretch the cavity length and tune the frequency of the pump. Note, stretching the pump cavity is preferable to stretching the ring cavity because the ring cavity modes are not disturbed, and thus the extremely narrow linewidth of the Brillouin laser is not degraded. Alternately, the error signal may be applied to the drive current of the laser diodes. Furthermore, both the dither and error signals may be applied to the PZT actuator or the drive current.

Figure 6:
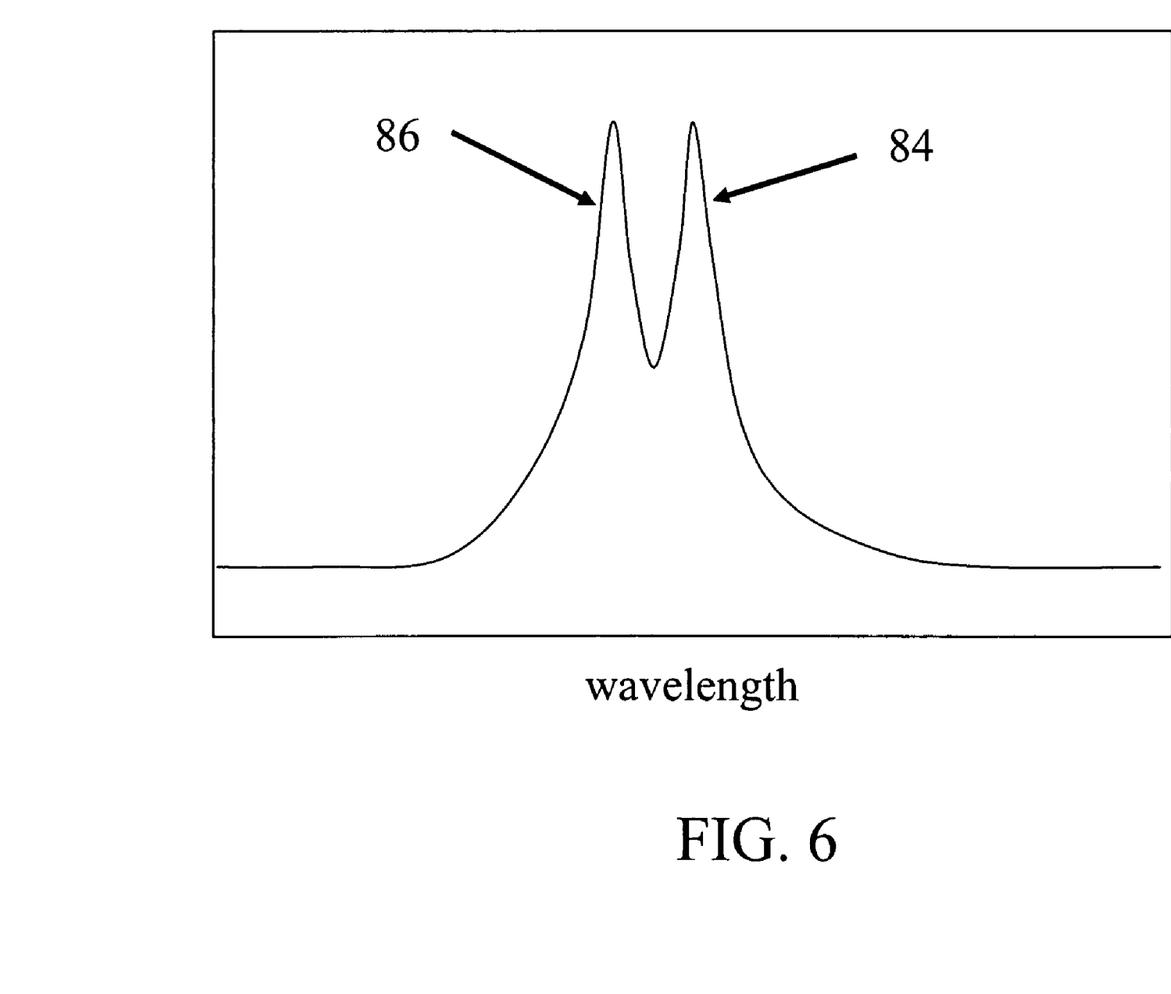
FIG. 6 illustrates a trace of the pump laser and the Brillouin fiber laser spectra.

FIG. 6 illustrates downshift of the Brillouin fiber laser wavelength 84 (cavity mode 32) with respect to its pump laser wavelength 86. The shift is given by $v_B = 2\,nV_a/\lambda$, where $V_a$ is the acoustic velocity in the fiber, n is refraction index of the fiber, and $\lambda$ is the pump laser wavelength.

Figure 7:
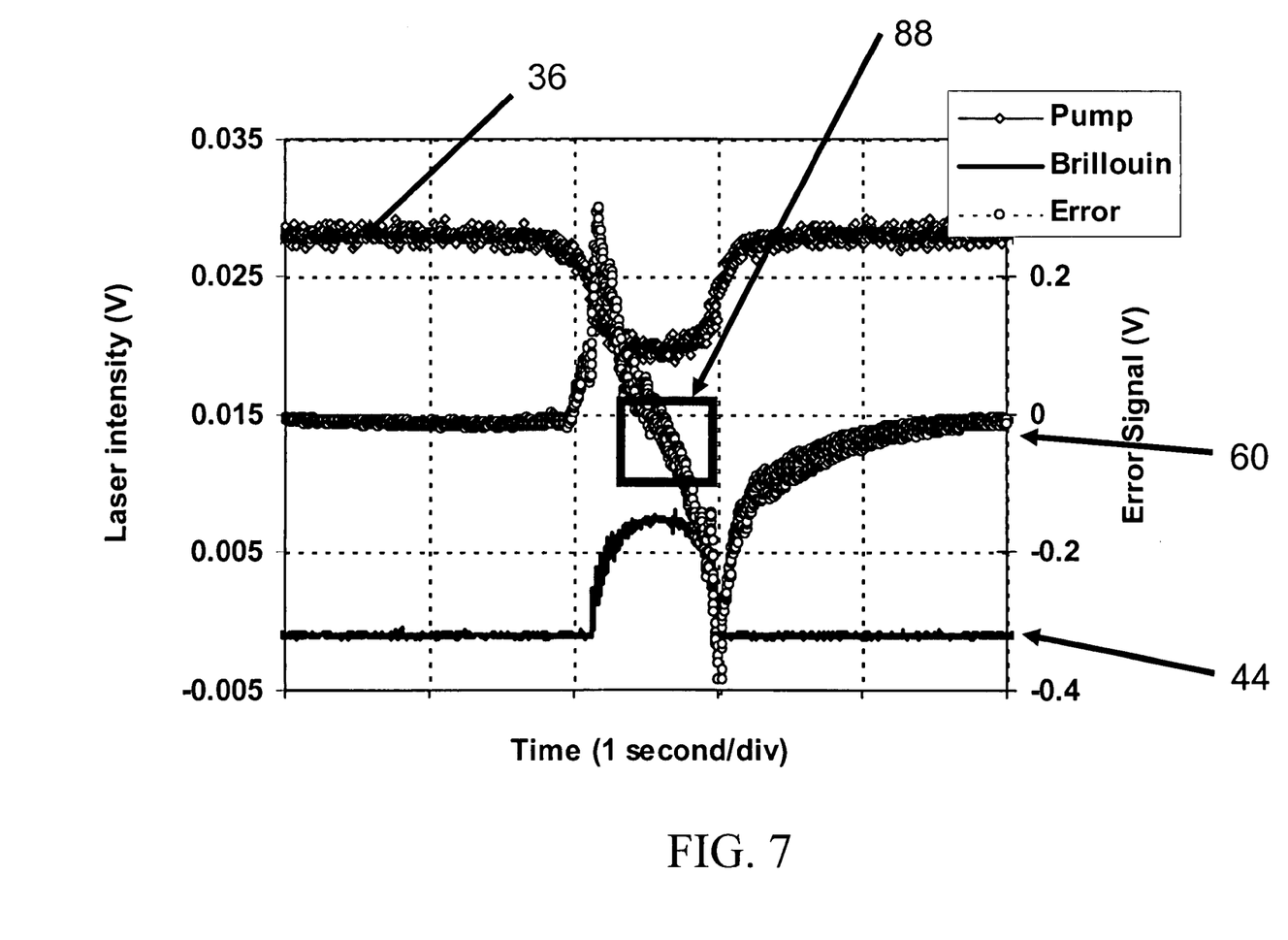
FIG. 7 illustrates relationship between the pump laser, the Brillouin laser, and the error signal used for the auto-tracking control loop that is based on the Pound-Drever-Hall frequency-locking technique.

FIG. 7 illustrates the relationship between the pump laser, the Brillouin laser and the error signal used for the auto-tracking control loop that is based on the Pound-Drever-Hall frequency-locking technique. When the pump laser frequency is resonant with one cavity mode of the Brillouin fiber ring laser it becomes trapped inside the cavity due to constructive interference. The intracavity intensity of the pump field is strong enough (in excess of the threshold) to produce the Brillouin laser beam 44. As a result of the pump trapping and pump depletion, the intensity of the transmitted pump beam 36 detected by photodetector 56 exhibits a dip. The demodulated signal or error signal 60 generated from electronics 58 and amplifier 62 (together suitably a lock-in amplifier) is used to rapidly tune the pump laser frequency so as to keep the error signal within a locking area 88. In this case, the active stabilization is achieved and the Brillouin fiber laser emits stable highly coherent Stokes radiation with extremely narrow spectral linewidth.

Figure 8:
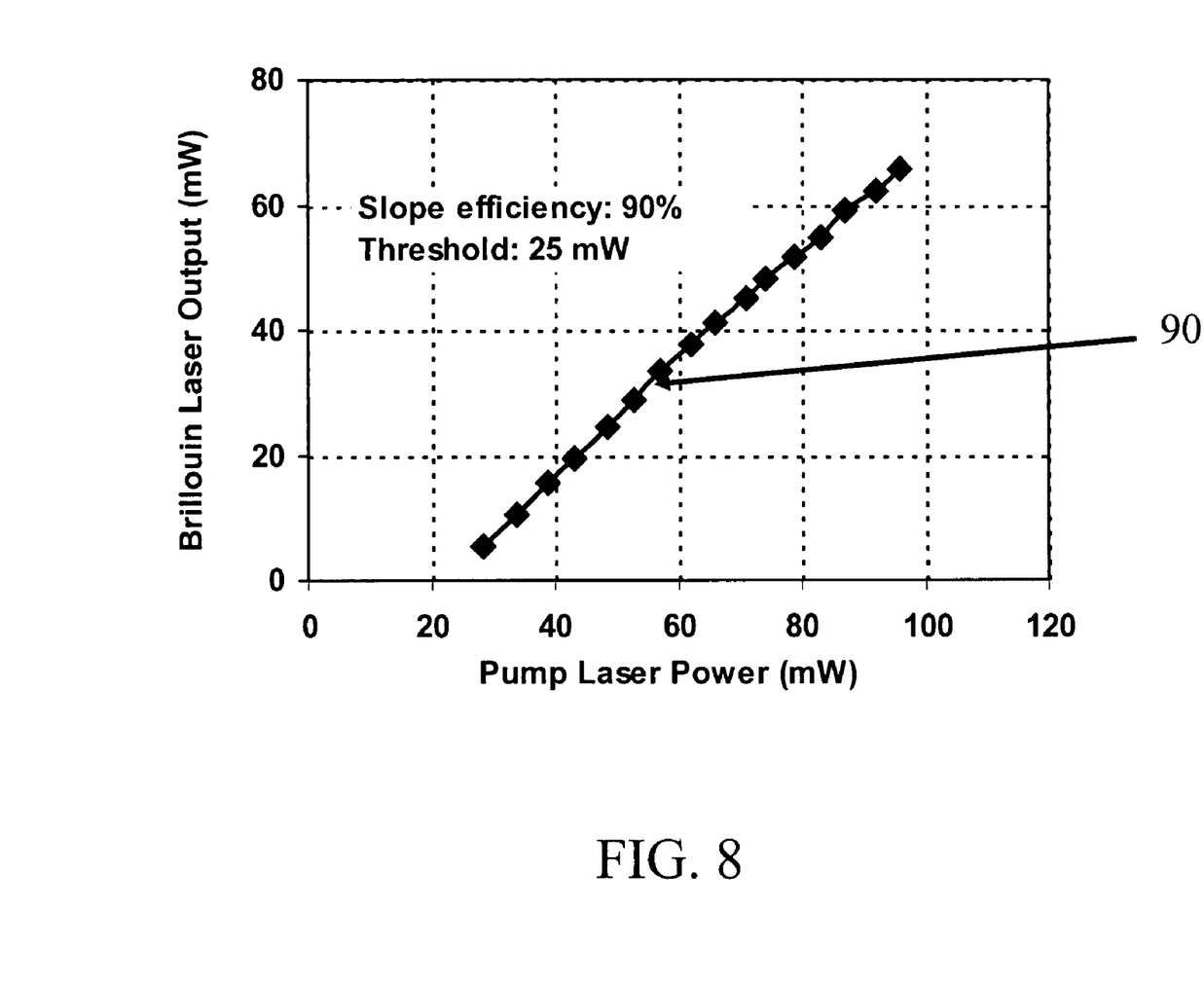
FIG. 8 illustrates output power of the Brillouin fiber ring laser versus pump power.
Figure 9:
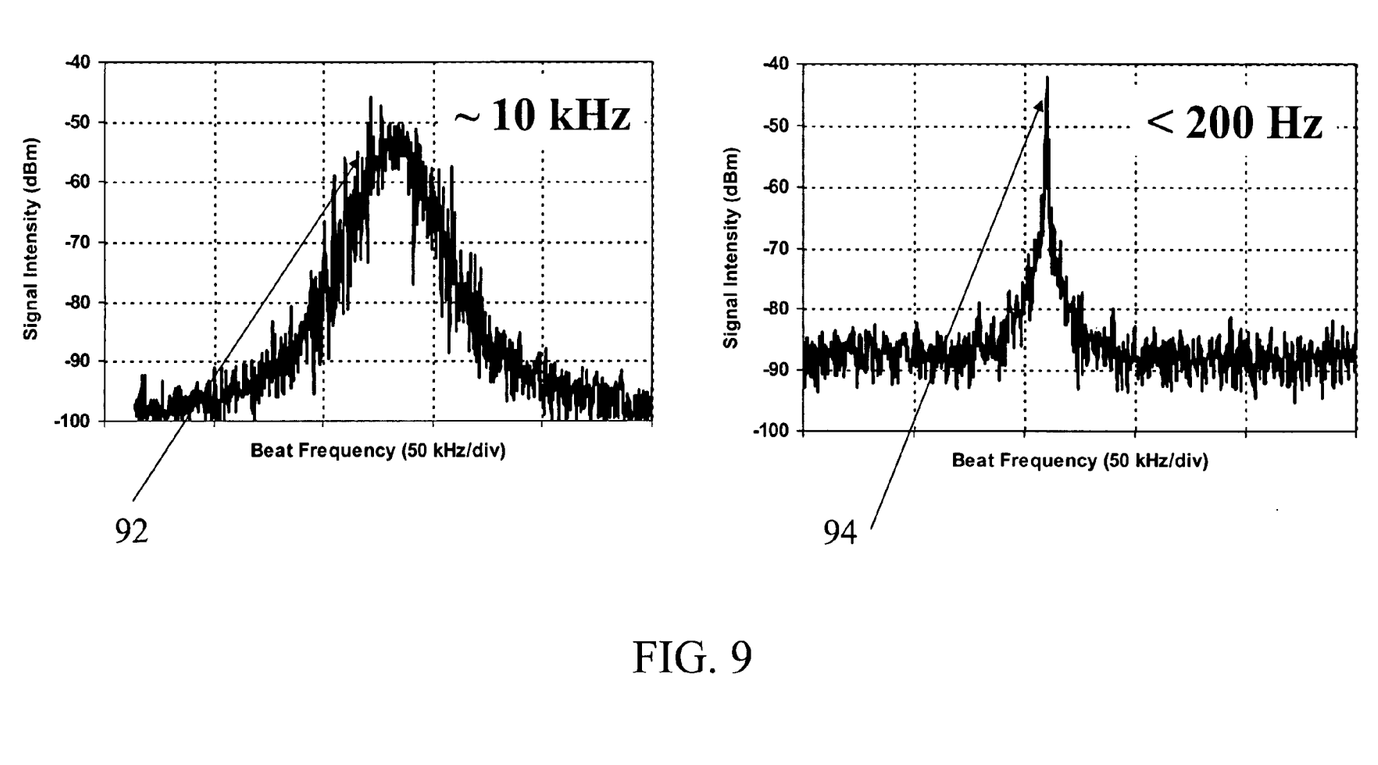
FIG. 9 illustrates heterodyne beat spectra of two independent lasers for both pump laser and Brillouin fiber laser, indicating their spectral linewidth is 10 kHz and <200 Hz respectively.

FIG. 8 illustrates output power 90 of the actively-stabilized Brillouin fiber ring laser versus pump power. FIG. 9 illustrates heterodyne beat spectra 92 and 94 of two independent lasers for both pump laser and Brillouin fiber laser, respectively, indicating their spectral linewidth is <10 KHz and <200 Hz respectively. The pump linewidth is suitably less than 1 MHz and preferably less than 10 KHz and the Brillouin linewidth is suitably less than 1 KHz and preferably less than 200 Hz.

Figure 10:
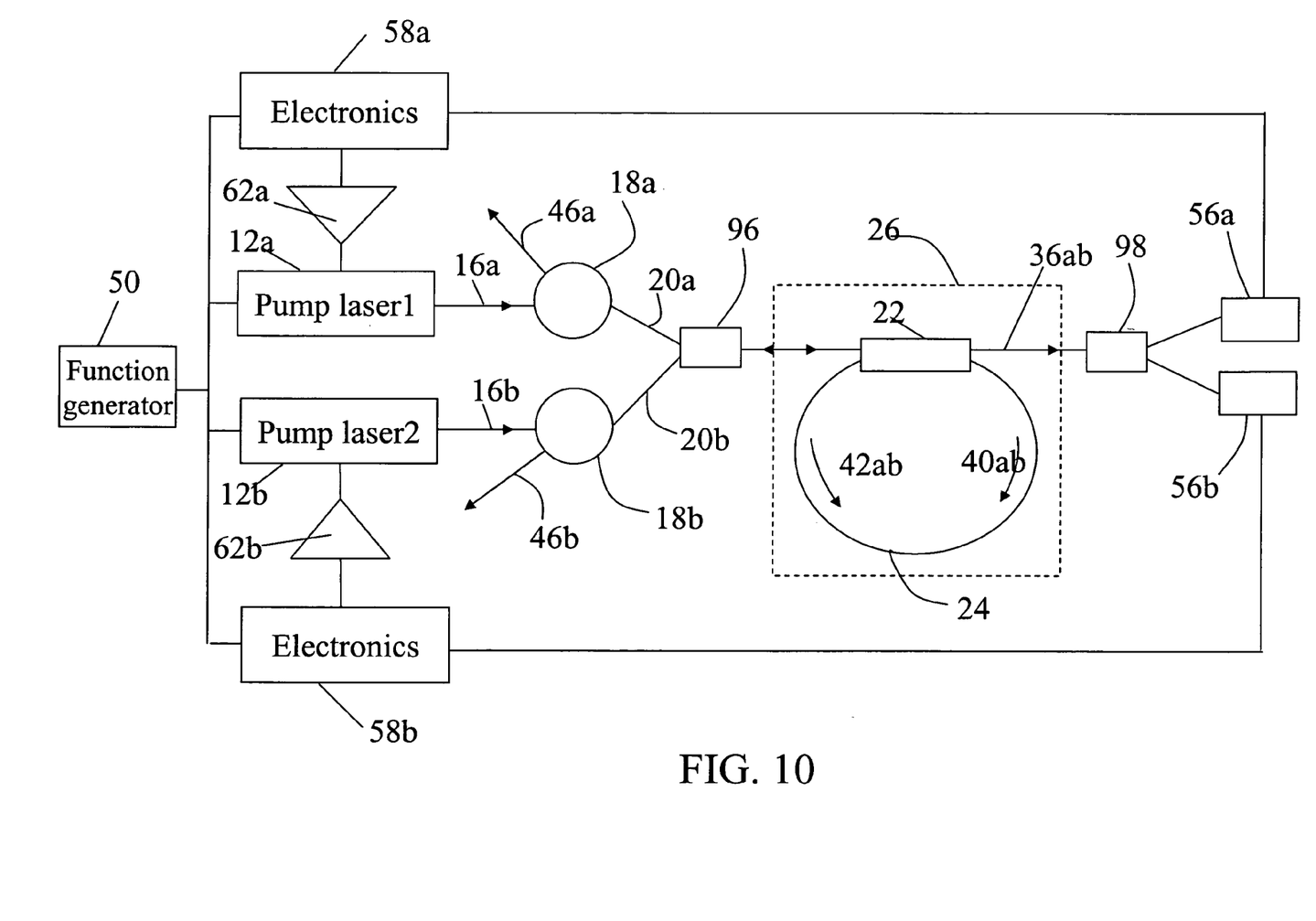
FIG. 10 illustrates a first embodiment of a dual-wavelength high-power actively stabilized Brillouin fiber ring laser with extremely narrow spectral linewidth.
Figure 11:
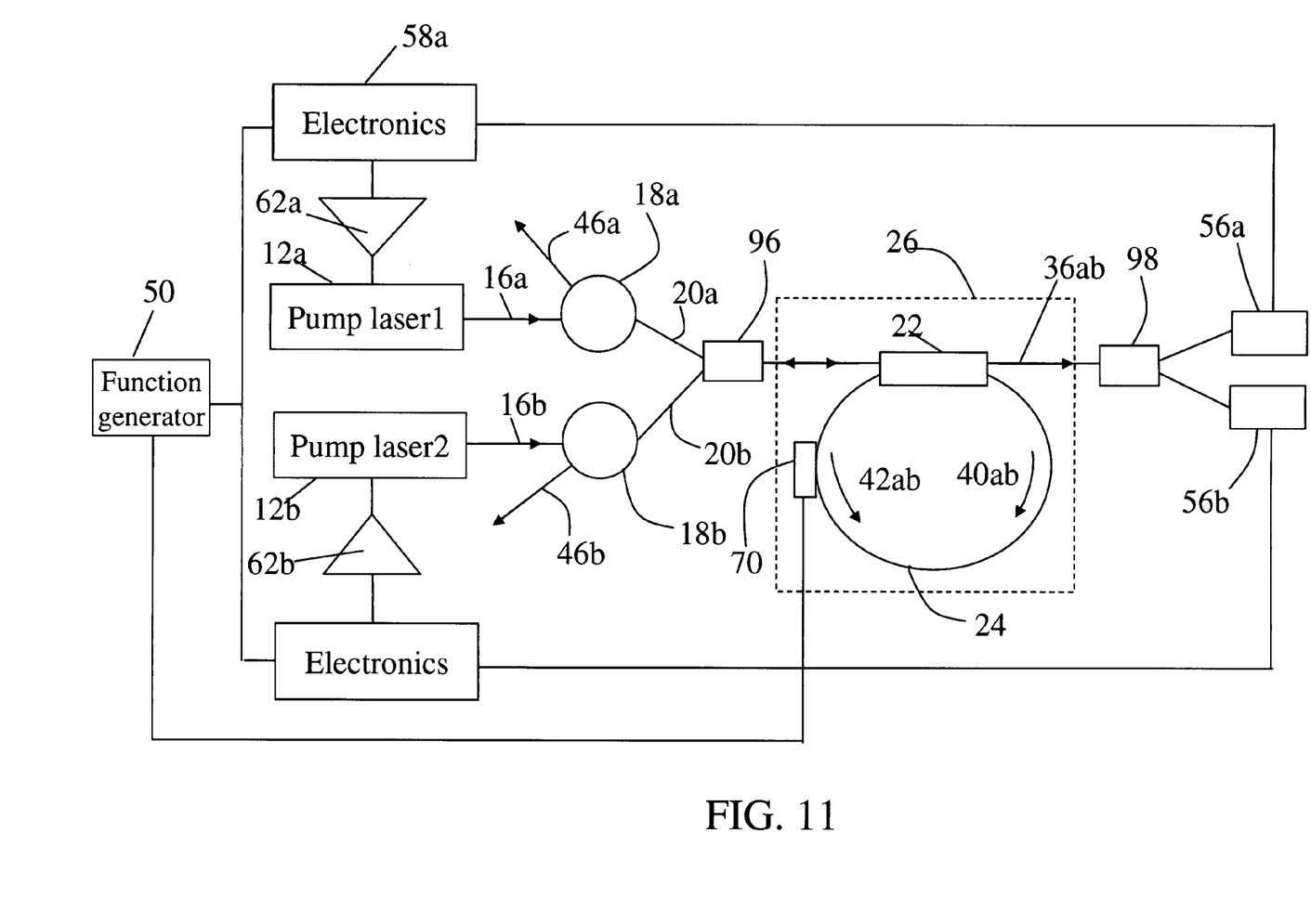
FIG. 11 illustrates a second embodiment of a dual-wavelength high-power actively stabilized Brillouin fiber ring laser with extremely narrow spectral linewidth.

Since Brillouin fiber lasers described in FIG. 1 and FIG. 4 are single-wavelength laser systems, which have a single pump beam 14 at one wavelength propagating in one direction, and a single Brillouin laser beam 44 at the downshifted wavelength propagating in the opposite direction, dual-wavelength lasers may be made to operate in a single Brillouin fiber ring cavity as illustrated in FIG. 10 and FIG. 11. FIG. 10 is a dual-wavelength Brillouin laser with active stabilization configuration similar to that in FIG. 1. FIG. 11 is another dual-wavelength Brillouin laser with active stabilization configuration similar to that in FIG. 4.

In some applications such as microwave photonics and radio astronomical observation, the generation of a tunable low-phase-noise microwave or/and millimeter wave source is usually essential. One method to generate such a source is optical heterodyning of two lasers with different wavelengths. For two individual lasers, however, the relative frequency fluctuation between the two lasers significantly limits the phase-noise performance of the microwave/millimeter-wave sources. Dual wavelength Brillouin fiber laser provides a solution for this problem, in which the relative frequency fluctuation can be completely eliminated by actively stabilizing the two pump lasers to a single Brillouin fiber cavity. Any phase fluctuation of the Brillouin fiber cavity will be cancelled in the optical heterodyning signal of dual wavelength radiations emitted from the single Brillouin fiber laser. If wavelength of any one of the two pump lasers is tuned, the frequency of the optical heterodyning signal (i.e., microwave or millimeter-wave source) would be tunable. Thus, the dual-wavelength Brillouin fiber ring laser can provide a tunable microwave local oscillator with extremely low phase noise and high signal-to-noise ratio, which is very useful for applications such as microwave photonics, radio astronomical observation.

Two pump lasers at two different wavelengths $\lambda a$ (laser $12a$~$18a$) and $\lambda b$ (laser $12b$~$18b$) are combined together through a pump beam combiner 96. The combiner 96 can be either a polarization-beam combiner, in which the two pump laser beams have orthogonal linear polarizations, or a wavelength beam combiner. The combined pump beams 40$ab$ propagate in one direction around the ring cavity, and two downshifted Brillouin beams 42$ab$ at wavelengths of ($\lambda a - 2 nV_a/\lambda a$) and ($\lambda b - 2 nV_a/\lambda b$) propagate in the opposite direction. The two Brillouin beams are separated by the combiner 96 and exit from fiber port 46$a$ and 46$b$, respectively. The transmitted pump beams 36$ab$ are separated by another identical combiner 98. Then, the two modulated pump signals are demodulated with two independent sets of feedback systems (56$a$~62$a$ for $\lambda a$, and 56$b$~62$b$ for $\lambda b$).

While several illustrative embodiments of the invention have been shown and described, numerous variations and alternate embodiments will occur to those skilled in the art. Such variations and alternate embodiments are contemplated, and can be made without departing from the spirit and scope of the invention.

We claim:

1. A Brillouin fiber ring laser, comprising:
   A Brillouin fiber ring cavity having at least one cavity mode within the Brillouin gain profile;
   A tunable pump laser that emits a single-frequency pump beam that is optically coupled to the ring cavity; and
   A feedback loop comprising a function generator that applies a dither signal to the pump laser frequency, said feedback loop actively tuning the pump laser to keep the frequency of the pump beam in resonance with one of said at least one cavity modes so that the cavity emits a single-frequency Brillouin laser beam at a different wavelength and having a different linewidth at least one order of magnitude narrower than the linewidth of said single-frequency pump beam.

2. The Brillouin fiber ring laser of claim 1, wherein the feedback loop further comprises:
   A detector that detects an intensity modulated portion of the pump beam coupled out of the ring cavity; and
   A demodulator that demodulates the intensity modulated portion of the pump beam to provide an error signal that actively tunes the pump laser frequency.

3. The Brillouin fiber ring laser of claim 2, wherein the function generator generates a reference signal, said demodulator comprising:

a mixer that mixes the intensity modulated portion of the pump beam with the reference signal into a mixed signal; and
a low pass filter that filters the mixed signal to provide the error signal.

4. The Brillouin fiber ring laser of claim 2, said dither signal having a dithering amplitude less than +/−100 kHz.

5. The Brillouin fiber ring laser of claim 1, the single-frequency pump beam having a linewidth of less than 10 kHz and the single-frequency Brillouin laser beam having a linewidth of less than 200 Hz.

6. The Brillouin fiber ring laser of claim 1, further comprising:
   A second tunable pump laser that emits a second single-frequency pump beam at a different wavelength than the first pump laser that is optically coupled to the ring cavity; and
   A second feedback loop that actively tunes the second pump laser to keep the frequency of the second pump beam in resonance with another one of said cavity modes so that the cavity emits a second single-frequency Brillouin laser beam at a different wavelength than the first Brillouin laser beam.

7. The Brillouin fiber ring laser of claim 1, wherein the pump laser is a fiber laser.

8. The Brillouin fiber ring laser of claim 1, wherein the ring cavity has only one cavity mode capable of lasing.

9. A Brillouin fiber ring laser, comprising:
   A Brillouin fiber ring cavity having at least one cavity mode within the Brillouin gain profile;
   A tunable pump laser that emits a single-frequency pump beam that is optically coupled to the ring cavity;
   A function generator that applies a dither signal to the pump laser frequency;
   A detector that detects an intensity modulated portion of the pump beam coupled out of the ring cavity; and
   A demodulator that demodulates the intensity modulated portion of the pump beam to provide an error signal that actively tunes the pump laser frequency to keep the frequency of the pump beam in resonance with one of said at least one cavity modes so that the cavity emits a single-frequency Brillouin laser beam at a different wavelength and having a different linewidth at least one order of magnitude narrower than the linewidth of said single-frequency pump beam.

10. The Brillouin fiber ring laser of claim 9, wherein the dither signal has a dithering amplitude less than +/−100 kHz.

11. The Brillouin fiber ring laser of claim 9, wherein the single-frequency pump beam has a linewidth of less than 10 kHz and the single-frequency Brillouin laser beam has a linewidth of less than 200 Hz.

12. A method for actively stabilizing a Brillouin fiber ring laser, comprising:
   Using a tunable single-frequency pump laser that emits a single frequency pump beam to pump a Brillouin fiber ring cavity having at least one cavity mode within the Brillouin gain profile;
   Dithering the pump laser frequency leaving the ring cavity undisturbed;
   Detecting an intensity modulated portion of the pump beam coupled out of the ring cavity;
   Demodulating the intensity modulated portion of the pump to provide an error signal; and
   Feeding back the error signal to actively tune the pump laser to keep the frequency of the pump beam in resonance with one of the ring cavity modes so that the cavity emits a single-frequency Brillouin laser beam at a different wavelength and having a linewidth at least one order of magnitude narrower than the linewidth of said single-frequency pump beam.

13. The method of claim 12, wherein the step of demodulating comprises:

mixing the intensity modulated portion of the pump beam with a reference signal having the same frequency as the pump beam and a known phase into a mixed signal; and low pass filtering the mixed signal to provide the error signal.

14. The method of claim 13, said dither signal having a dithering amplitude less than +/−100 kHz.

15. The method of claim 13, said single-frequency pump beam having a linewidth of less than 10 kHz and the single-frequency Brillouin laser beam having a linewidth of less than 200 Hz.

* * * * *